May 8, 1923. 1,454,201

J. WHEWELL ET AL

SELF COUPLING FOR MINE CARS

Filed May 24, 1921 3 Sheets-Sheet 1

James Whewell
H. I. Yoder
INVENTOR

BY *Victor J. Evans*
ATTORNEY

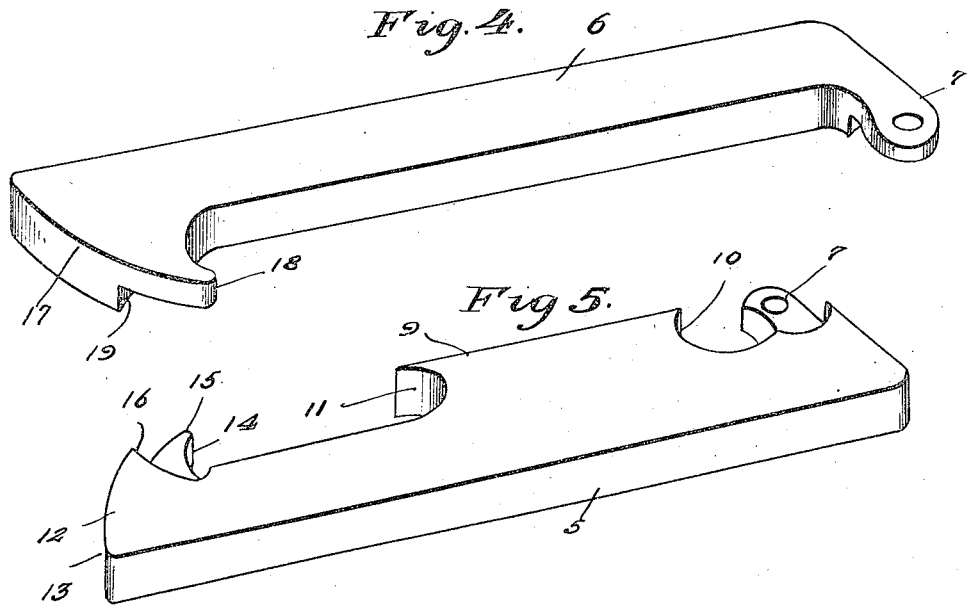
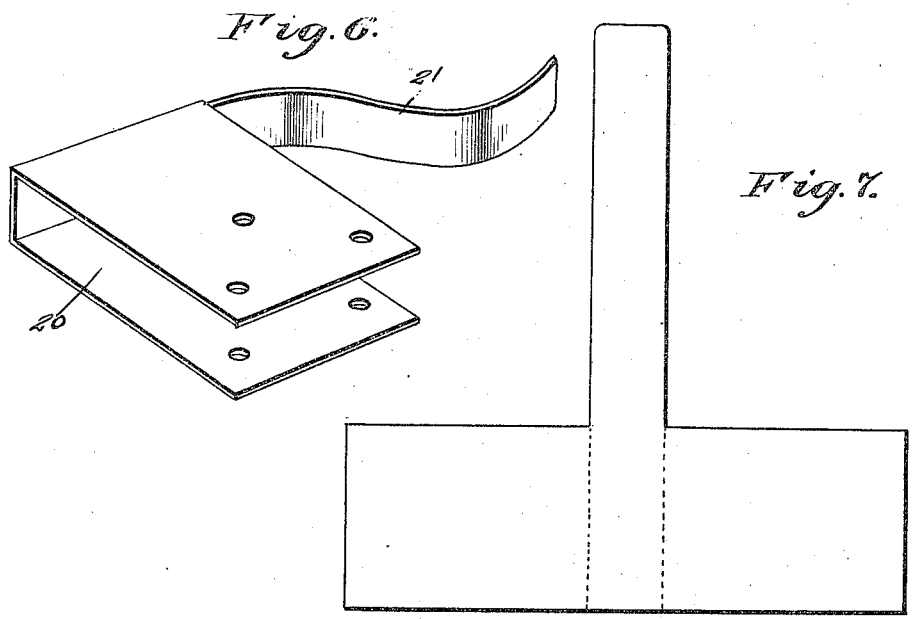

May 8, 1923.
J. WHEWELL ET AL
1,454,201
SELF COUPLING FOR MINE CARS
Filed May 24, 1921
3 Sheets-Sheet 3
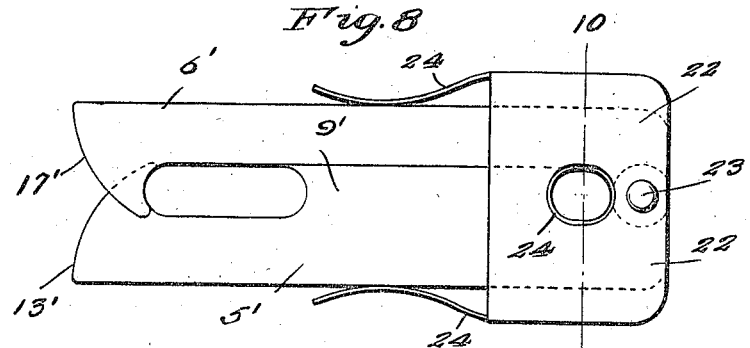
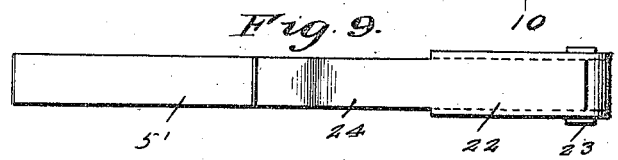
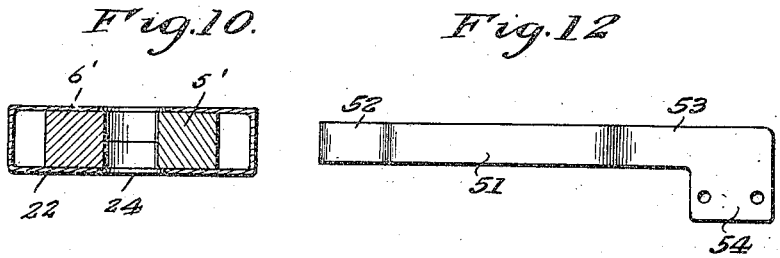
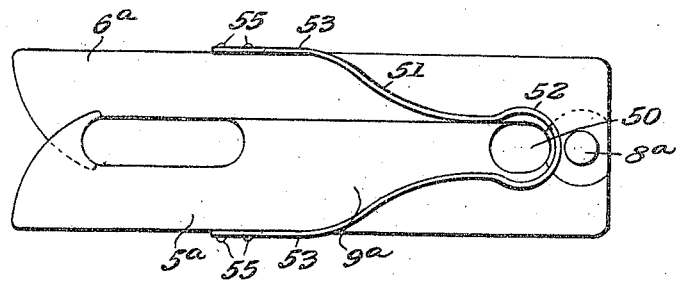
James Whewell
H. I. Yoder
INVENTOR
BY *Victor J. Evans*
ATTORNEY
WITNESSES Patented May 8, 1923.

1,454,201

UNITED STATES PATENT OFFICE.

JAMES WHEWELL AND HARLEY I. YODER, OF HOLSOPPLE, PENNSYLVANIA.

SELF-COUPLING FOR MINE CARS.

Application filed May 24, 1921. Serial No. 472,211.

*To all whom it may concern:*

Be it known that we, JAMES WHEWELL and HARLEY I. YODER, citizens of the United States, residing at Holsopple, in the county of Somerset and State of Pennsylvania, have invented new and useful Improvements in Self-Couplings for Mine Cars, of which the following is a specification.

Our present invention has reference to a means primarily adapted for coupling mine cars but which may be successfully used in other connections and wherein two movable members may be automatically coupled together by the movement of one member toward the other, thus obviating the danger of applying coupling pins to links in the ordinary manner.

A further object is to produce a link coupler comprising two members which have one of their ends pivotally connected, their other ends formed with inwardly flared jaws, while spring means is arranged between the members for normally swinging the same toward each other, the construction being such that a pin or the like disposed in contacting engagement with the jaws will spread the same to permit of the said pin being received between the jaws.

A further object is to produce a coupler for mine cars or the like which comprises two members that are pivotally connected at one of their ends and which receive between the pivoted ends a coupling pin of a car, means being provided between the members for limiting the swinging and lateral movement of the coupler with respect to the pin, said members having their opposite ends formed with inwardly inclined or flared jaws provided with interengaging means therebetween, spring means forcing the members normally together for holding the jaws associated, said jaws designed when contacted by the coupling pin of the second car to cause the pin to move between and to spread the jaws and to be received between the jaws, while means is provided on one or both of the members for limiting the longitudinal movement of the coupler toward the last mentioned coupling pin.

The foregoing, and other objects which will appear as the nature of the invention is better understood, may be accomplished by a construction, combination and operative association of parts, such as is disclosed by the drawings which accompany and which form part of this application.

In the drawings:—

Figure 4 is a perspective view of one of the coupler members.

Figure 5 is a similar view of the coacting member.

Figure 6 is a view of the spring carrying yoke.

Figure 7 is a view of the blank from which the yoke and spring are formed.

Figure 8 is a plan view of a modification.

Figure 9 is an edge view thereof.

Figure 10 is a sectional view on the line 10—10 of Figure 9.

Figure 11 is a plan view of a still further modification.

Figure 12 is a side elevation of the spring employed in the construction disclosed by Figure 11.

Figure 1:
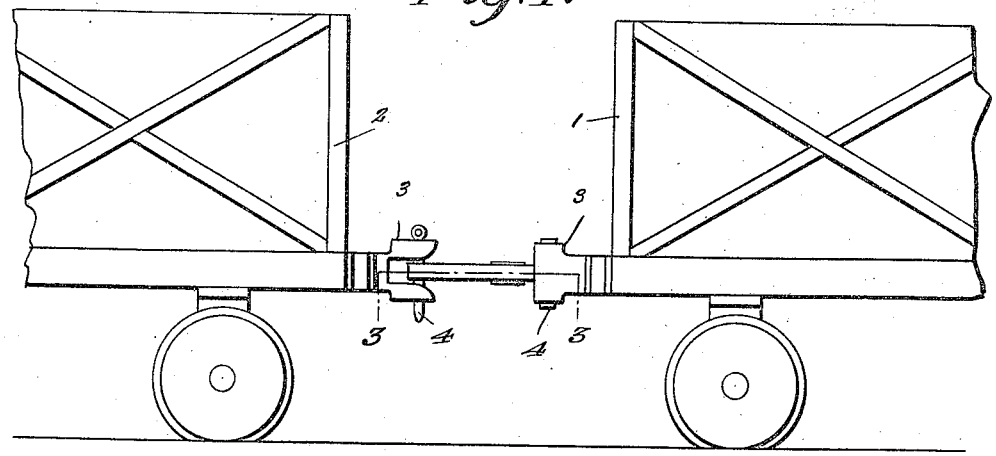
Figure 1 is a side elevation of two mine cars coupled in accordance with this invention.
Figure 2:
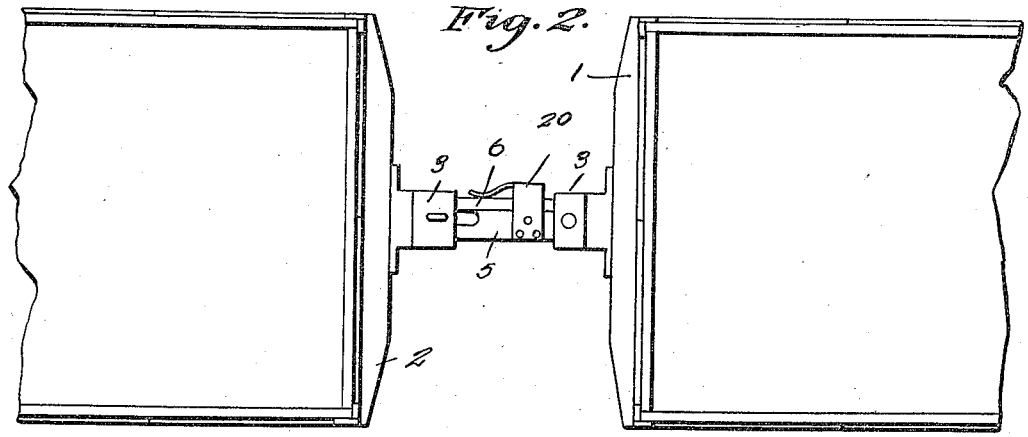
Figure 2 is a top plan view thereof.
Figure 3:
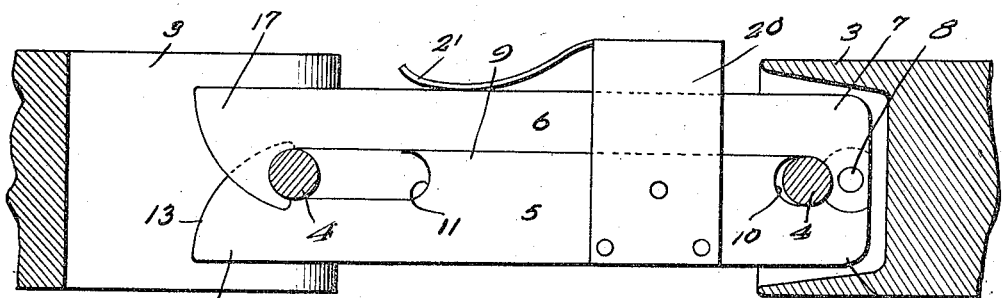
Figure 3 is a sectional view on the line 3—3 of Figure 1, on an enlarged scale.

In the drawings, two mining cars are indicated by the numerals 1 and 2 respectively. Each of the cars has at its confronting end the usual draw bar which is provided at its outer end with the upper and lower jaws 3 between which the coupling pins 4 pass.

The coupling pin 4 on the coupler provided by the jaws of the car 1 is designed to engage with the coupling member or link constructed in accordance with our invention.

Our improved coupling link comprises two substantially rectangular members 5 and 6 respectively. Each of these members have at one of their ends inwardly directed ears 7. The ears have their opposite faces reduced whereby one of the ears is arranged over the other ear. The inner walls provided by the reduced portions are concaved and the ends of the ears are rounded. Passing through the lapping ears is a pivot 8, whereby the members 5 and 6 are hingedly connected. The member 6, at a suitable distance inward of its ear 7 has on its inner face a widened portion providing a rib 9. The rib is of the same thickness as the body of the member 5, and has both of its ends concaved, as at 10 and 11 respectively. The opposite end of the member 5 is formed with an inwardly extending jaw 12. The jaw has its outer face rounded, as at 13 and its inner face concaved, as at 14. The jaw, on one of the faces thereof, at its beak 15 is reduced or cut away, the inner wall of which providing a rounded shoulder 16.

The body of the member 6 is straight throughout the length thereof except at its ends, its outer end, or that opposite the end formed with the ear 7 is provided with a jaw 17, of a similar size and shape to that of the jaw 13. The beak 18 of the jaw 17 has one of its faces depressed or cut away, the inner wall thus provided being rounded to provide a shoulder 19. The shoulder 19 is designed to be contacted by the beak 15 of the jaw 13 when the jaws are brought together, and in a like manner, the shoulder 16 of the jaw 13 is designed to be engaged by the beak of the jaw 17.

Secured to the opposite faces of the jaw 5, slightly inward of the concaved end or shoulder 10 provided by the rib 9, is a yoke 20. The yoke is preferably constructed from a single piece of spring metal, and is integrally formed, at the center thereof with an extension which is bent or otherwise shaped to provide a flat spring member 21 that is designed to contact with the outer edge of the jaw 6, to swing the said jaw on its pivot 8 to bring the inner face thereof in contacting engagement with the inner face of the lip 9, and also the beaks of the respective jaws together and in contacting engagement with the respective shoulders 16 and 19, as previously set forth.

The coupling link being received between the jaws of the coupler and the car 1 will be held against downward tilting, so that the inwardly rounded ends of the jaws will be in a position to contact therebetween the pin on the coupler of the car 2, when either of the cars are brought toward each other. The contacting engagement of the coupler pin with the outer rounded faces of the jaws will cause the said pin to ride between the jaws, spreading the jaw 6 away from the jaw 5. The jaw 5 may be termed the stationary jaw of the improvement, as the yoke 20 is secured thereto. When the pin rides off of the beaks of the jaws the spring 21, which is integrally formed with the yoke 20 will exert a pressure against the outer edge of the jaw 6, causing the said jaw to move to closed position with respect to the jaw 5, and in so doing exert a pressure against the pin to cause the same to be received in the space between the concaved shoulder 11 and the beak of the jaw 5, the contacting engagement of the pin 4 with the shoulder 11 limiting the longitudinal movement of the coupler in the direction of the pin. The movement of the coupler on the pin of the car 1 is limited to the space between the shoulder 10 of the rib, and the ears of the jaws, while the movement of the coupler on the pin of the car 2 is limited to the space between the shoulders 11 and 14, so that while a free movement of the coupler between the jaws is provided, such movement is limited.

The above construction refers to a device which is employed on comparatively light mining cars, and for heavy cars the members 5′ and 6′ are constructed in a similar manner to that above described, having their inner ends provided with ears which are pivotally connected, the member 5′ provided with the central rib 9′, and the outer ends of both of the members provided with the jaws 13′ and 17′. The yoke employed, is, however, somewhat different from that previously described. The yoke is indicated by the numeral 22 and in reality comprises a socket member, the pivot 23 employed for connecting the ears of the coupler sections 5′ and 6′ also serving as a means for holding the yoke on the couplers. The opposite sides of the yoke have elongated openings 24 therethrough, in a line with the space between the ears of the jaws and the inner concaved shoulder of the rib 9′. The sides of the yoke are arranged a considerable distance outwardly from the sides of the coupler members 5′ and 6′, and on these sides there are flat spring members 24 which are arranged at an inward inclination and have their ends rounded and in contacting engagement with the outer edges of the jaws 5ª and 6′, thus forcing the jaws toward each other and sustaining the coupler in normally closed position.

In Figure 11 the jaw members 5ª and 6ª are similarly constructed to those above described, the jaw 5ª having its inner edge provided with the rib 9ª, the said jaws being pivotally connected at their rear end and being provided with an elongated opening 50 between the rib 9ª and the ears that receive therethrough the connecting pivot 8ª. The spring 51, in this instance has its body portion arranged over the top of the jaws, being centrally rounded upon itself to provide an eye 52 that surrounds the opening 50, the arms of the spring from the said eye being rounded outwardly and from thence continued straight in a line with the sides or edges of the jaws 5ª and 6ª. These straight portions, indicated by the numeral 53 are widened on their lower edges, as indicated by the numeral 54 in Figure 12. The widened portions 54 are in direct contact with the outer sides or edges of the jaws 5ª and 6ª, and have openings therethrough for the reception of suitable headed securing means 55.

Having described the invention, we claim:—

A link coupler comprising a pair of substantially rectangular plates having inwardly directed overlapping ears pivotally connected and securing the plates together at one end, inwardly directed overlapping beaks at the other ends of the plates, one of said plates being recessed between its ends, the other plate having an elongated recess on its inner edge from its beak to a point approximately at its center and a substantially circular recess near its other end adjacent its ear, a rib separating said recesses adapted to engage the inner edge of the opposite plate within the recess of the latter, said recesses receiving the coupling pins on adjoining cars, a yoke secured to one of the plates, and a spring arm extending from one end of said yoke engaging the outer edge of the other plate to maintain the parts in a normally contacting position.

In testimony whereof we affix our signatures.

JAMES WHEWELL.
HARLEY I. YODER.